UNITED STATES PATENT OFFICE.

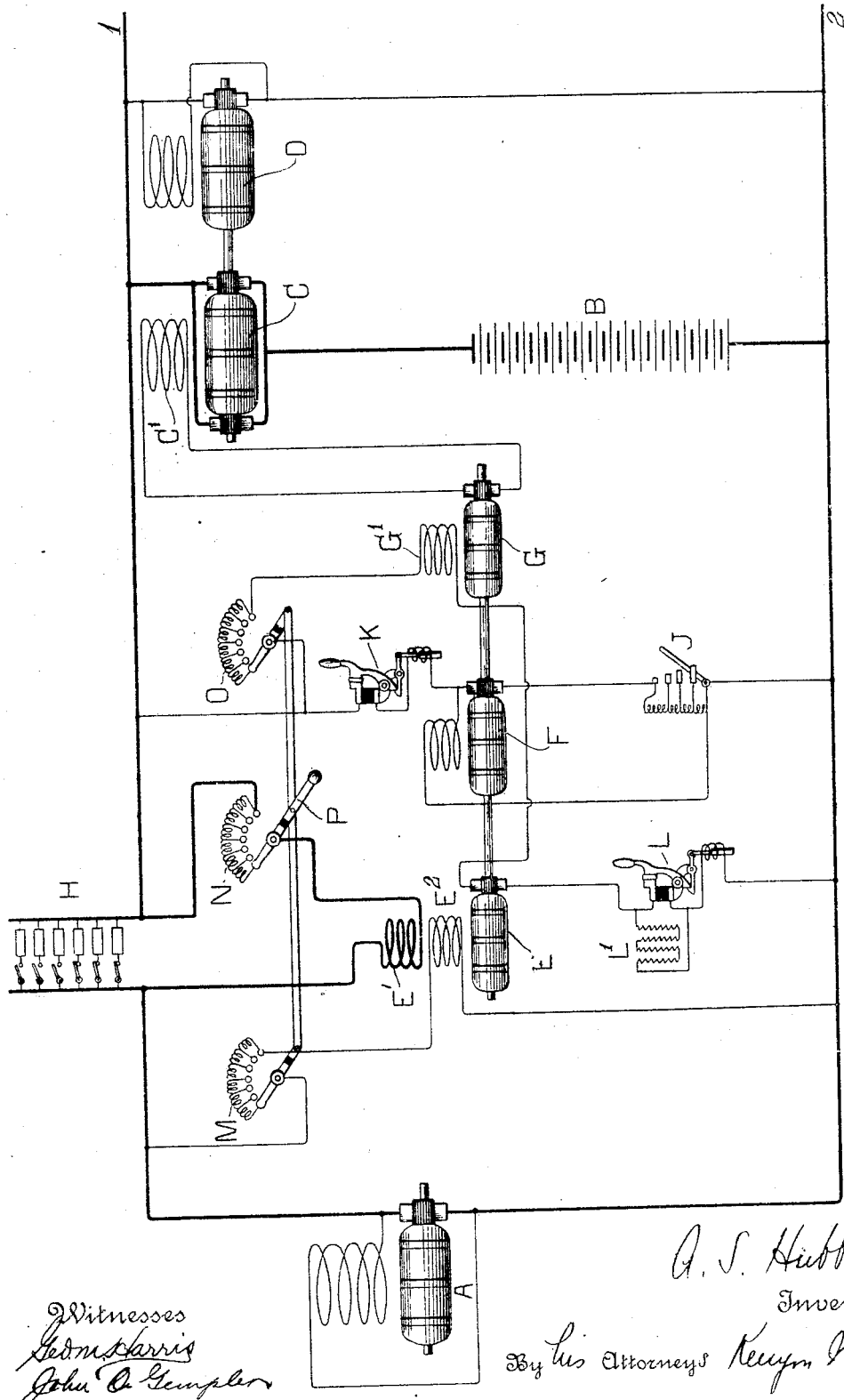

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

956,353.  Specification of Letters Patent.  Patented Apr. 26, 1910.

Application filed June 13, 1906. Serial No. 321,448.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution and especially to systems employing regulating batteries. In this class of system it has become the standard practice whenever the regulating battery is placed in proximity to the main generator or generators, to regulate the current in the battery in accordance with the fluctuations of current strength on the main generator, these fluctuations being magnified by intermediate regulating apparatus, primary regulation being by a coil in the generator circuit. Such a system was, for example, shown by me in my Patent No. 651,664 of June 12, 1900, as well as in many later patents issued to me and to others. In this type of system it is desirable that efficient regulating apparatus be provided that will control the battery current with the smallest possible changes of the main generator current and yet that this shall be done with as small a regulating apparatus, which is as little wasteful of energy, as possible. The principal improvements embodying my present invention are directed toward this end. While I have described my invention in connection with the above type of regulation, it will be understood that my invention in its broader phase is applicable to the type of system where the primary regulating coil is responsive to voltage changes rather than generator current changes where it seems desirable to employ such a system. In order to regulate the battery current I provide the usual booster with its armature in series with the battery circuit and I regulate the field of this booster by a separate exciter dynamo, while the field of this exciter is in turn regulated by a counter electro-motive force machine controlled by variations of current in the generator circuit. Thus a slight change of current in the generator circuit, producing but a slight change in the counter electro-motive force machine, will be effective to produce wide variations in the exciter voltage, because the amount of energy required by the exciter field will be small, while the relatively wide variations of the exciter output will produce wide variations in the booster output. By using the exciter intermediate to the counter machine and the booster, the counter machine may be made small and this is extremely important because the capacity of the counter machine must be very much greater than the energy it is to supply for regulation.

Another feature of my invention, which involves a great improvement in the fineness of regulation obtained while permitting the use of smaller regulating machine, involves a special construction of the regulating machines. This special construction may be applied to all three of the machines or to any one or any two of them, or it may be applied to other specific types of regulating apparatus for controlling the battery current. I prefer to employ the specific system described and to provide a special construction for all of the regulating machines, but where less fineness of regulation is needed the principle of my invention need not be carried so far. The special construction involves the winding of the regulating machine or machines with a specially bulky field winding. In the case of the booster field and the exciter field the winding should be one that would give the ampere turns needed for the proper field magnetization when the current density in the field winding is extremely low. In the case of the counter machine this same principle may be followed where it is desired to use the smallest possible energy for regulating the counter machine, but where, as in the present instance, that machine is wound with opposing field windings, I prefer that the regulation be improved by specially designing each field winding for an excessive number of ampere turns; but both of these principles may be combined in designing the winding for the counter machine. By this improvement I find that although the field windings are relatively bulky compared to what they would be for machines of like output wound for the normal efficiency, yet that because of the interaction of the machines upon one another, the net result is the employment of smaller regulating apparatus having less bulky field windings and with the regulation very much improved. In fact, I have found that by following out this principle of regulation I can obtain any sensitiveness of the regulating machinery desired, so that the only danger to be avoided is that the regulating apparatus may not become so sensitive as to be too much affected by slight inaccuracies of design and slight changes of voltage occurring here and there in the system of such a character that one can not foresee and calculate for them.

Still another feature of my invention is directed toward improvement in the adjusting of the apparatus whereby without disturbing the average load on the main generator I may permit any desired proportion of the working circuit changes to fall upon the main generator when desired.

My invention is in one specific embodiment illustrated in the diagram accompanying this specification.

A main generator is shown at A. This generator may be of any type or there may be several of them working together.

B is the battery and C the armature of a booster in series therewith.

The generator branch and the battery branch unite at the points 1 and 2 to feed the working circuit to the right of these points of junction. The booster C is driven by motor D connected across the working circuit.

E and G are the armatures, respectively, of a counter machine and an exciter for the booster. These armatures are mechanically connected to the armature F of a motor which, in the present instance, is connected across the generator circuit. The field coil C' of the booster is connected to the terminals of the armature G so that the current in the booster will vary in direction and amount according as the output of armature G varies. The field winding G' of the exciter is connected in series with the armature E of the counter machine, the two being in a branch circuit connected across the generator circuit. The field winding G' is, therefore, subjected to the resultant of the opposing potential differences of the main generator and of the counter machine E and this current varies as this resultant varies. To vary this resultant the magnetizing power of the field magnet of the counter machine is varied according to the variations of the main generator current. This is effected by the coils E' and E², the former being the primary regulating coil, while the latter, in the present instance, is a coil adjusted for a fixed potential.

H represents a bank of resistances shunting the coil E', each, as indicated, having a switch so that it may be cut in or out of the generator circuit. When all of these switches are opened the coil E' is responsive to changes of current strength from the generator because the entire current from the generator passes through it. Usually, however, one or more of the shunts H would be included in the circuit so that the coil E will only receive some definite proportion of the main generator current, but it is still in the generator circuit and responsive to generator current variations, the shunts merely serving as a means for varying the average load that is to be permitted to fall upon the main generator. The voltage of the counter machine will therefore vary as the current in the coil E' varies so that as that current varies the exciter output will vary and the booster voltage will vary accordingly.

J indicates a starting rheostat for the motor F.

K indicates a circuit breaker in the circuit of the motor F.

L represents a circuit breaker short circuiting the resistance L' in the circuit of the counter machine, this device and its functions being set out in my prior Patent No. 798,414, August 29, 1905.

M, N and O represent three adjustable resistances whose functions will be hereinafter set out. These resistances may be operated simultaneously, as indicated, by the lever P.

As so far described the operation of the system is as follows: The apparatus being adjusted in such a way that a given average current is to fall upon the main generator, while the main generator is not to be permitted to depart from that average more than is necessary, the regulating apparatus will be in such a condition that when that average current is being given out by the main generator no current will be passing through the battery circuit. At this time the booster voltage is *nil*, the exciter voltage is *nil*, and the counter machine voltage is exactly equal to that of the main generator. Should there be an increase of load on the working circuit there would be a tendency to increase the generator load, but a slight increase of the generator load acting upon the coil E' will cause the counter machine to increase in voltage and so overpower the voltage of the generator acting upon the coil G' of the exciter, whereby there will be a current from the counter machine through the exciter winding and a corresponding flow from the exciter armature to the booster field winding, energizing the booster field so that its armature will produce an electromotive force in the proper direction and of the proper value to cause a sufficient increase of battery discharge to prevent further change on the main generator. If this discharge continues the battery voltage will tend to fall and the battery current will fall, thus tending to still further increase the generator load, but a slight increase falling upon the generator will act in the same manner as before to still further increase the booster voltage. Upon a decrease of the generator current below the average for which the regulating apparatus is set the counter machine voltage falls below that of the generator, so that there is a current in the opposite direction through the coil G', resulting in a booster voltage in a direction tending to make the battery charge. As the battery voltage rises during a period of charge, less current tends to pass from the generator to the battery but this change is also limited because of the reduction of the current it causes in the primary regulating coil E'.

In order to make the regulation extremely sensitive I specially wind each of the windings C' and G' so that they will have a low maximum current density compared with what machines of similar size would ordinarily have. I also prefer to specially wind the coils E' and $E^2$ so that they will have an excessive number of ampere turns for the magnetizing power required, while the coil E' may be specially wound to have a specially low maximum current density. In order to explain the mode of operation and the results attained by these types of windings I will point out generally the effect of these special windings.

The booster armature must necessarily have a certain output and to obtain this output it will be necessary to have a definite magnetizing force in the booster field. This force is practically proportional to the ampere turns in the field winding. Ordinarily, in winding such a machine the designer winds from the standpoint of a reasonable efficiency with a sufficiently small bulk so that there will not be too much heating of the field magnet. In my case I wind specially with a view to reducing the percentage of change necessary to fall upon the main generator and I, therefore, provide a field winding that is bulky because having low maximum current density in order that less energy may be required from the exciter G, and, therefore, that less energy may be required in the field winding G', so that the counter machine E will not need to vary in voltage as much, whereby the generator current will not need to vary as much as with a normal construction of the apparatus. Thus the standard type of booster may readily have twice the ordinary field winding without changing its mechanical construction, whereas with slight changes of mechanical construction much greater increase than this may be made. Assume that the wire, without being changed in section, is doubled in length. This means that for a given voltage from the exciter G only half the current will pass to the booster field winding and, therefore, only half the energy will be used in it. However, since there is half the current and twice the number of turns, the magnetizing power will be the same as before. Because of this change, therefore, the output of the exciter is reduced fifty per cent., the exciter field energy needed is proportionately reduced, while the counter machine will only need to change one half as much as before to produce the desired booster field. The generator changes have been cut in two. These changes can again be cut in two by following the same principle in specially winding the field G'. With these two changes the regulation of the generator load has been improved seventy-five per cent., while the exciter is a smaller machine and the motor F is also smaller.

In designing the counter machine it is obvious that no special advantage can be gained by designing the coil $E^2$ with specially low maximum current density because this would do no more than save a little of the energy used in the shunt circuit containing that coil. Such a change would not in any way improve the regulation. The same thing is true as to the coil E'. The special winding of this coil for low current density would not improve the regulation and would only be advantageous where the energy consumed in the coil $E^2$ is large. By my employment of the exciter intermediate to the counter machine and the booster, and by my special windings of the exciter and the booster the counter machine becomes small and the amount of energy consumed in the coil $E^2$ becomes small. In designing the counter machine I prefer to have the coils more bulky than would be needed to obtain the requisite magnetizing power for producing the necessary voltage from the counter machine, but in order to improve the regulation the coils E' and $E^2$ should each have greater magnetizing power than is needed. Thus if the coil E' is wound so that it would give twice the magnetizing power required by the field magnet while the coil $E^2$ is wound to have a magnetizing power equal to that required by the field magnet, then any change of current in coil E' would cause twice as great a change of the voltage output of the counter machine, thereby reducing the percentage of regulation fifty per cent. as compared with what would be obtained from a counter machine having a single winding $E^2$.

The rheostats M, N and O mechanically connected together to be operated are provided in order that without change of the average load upon the main generator the system may be adjusted for different characters of regulation. Omitting for the moment rheostat O it will be seen that the simultaneous reduction of resistances M and N simultaneously increases the voltage across the opposing coil $E^2$ and the strength of the coil E' for any given current on the main generator. By varying these resistances simultaneously, therefore, and in the same direction the average load upon the main generator to produce a voltage in the counter machine equal to that of the line will not be changed, provided that the resistances M and N are suitably proportioned relatively to each other. But when there is a change of resistances M and N any departure from the average current on the main generator will produce a different effect upon the magnetization of the field magnet of the counter machine. The smaller the resistances M and N the greater will be the effect of any change of current on the main generator and, therefore, the finer will be the regulation obtained. When, therefore, the resistances M and N are all cut out the best possible regulation is obtained, but when it is desirable that a higher proportion of the fluctuations of load on the system should fall upon the main generator, then more or less of the resistances M and N are simultaneously cut into their respective circuits. At the same time that the resistances M and N are varied the resistance O is varied. The latter is in the circuit of the counter machine and exciter field winding G′. When the resistance O is high the counter machine will have relatively small effect upon the voltage of the exciter G, whereas when the resistance O is low the counter machine will have relatively great effect upon the exciter voltage. The varying of the resistance O simultaneously with the resistances M and N therefore magnifies the variations in the regulation. Thus an increase of all three resistances means that a change of the generator current will have less effect upon the counter machine than before, while in turn the counter machine changes have less effect upon the exciter and, through the exciter, upon the booster than before. By these means by the employment of a single lever the station attendant can at any time adjust the apparatus to obtain the closest possible regulation, or, when desirable, can relieve the battery of a large proportion of the fluctuations.

It will be understood that I have illustrated my invention by showing one embodiment thereof but that the invention I have disclosed is generally applicable to systems employing regulating batteries at central stations or at sub-stations regardless of the particular details of the system to which it is applied. Moreover, my invention in its broader phase is applicable to the employment of booster sets wherever it is desired to regulate the booster in accordance with slight changes of electrical condition of some portion of the system. At the present time the use of regulating batteries in connection with rectifying devices connected to alternating current systems is being practiced and it will be understood that my invention is applicable to such systems. In fact, in my application Serial No. 320,954, filed June 9th 1906, I show the present arrangement of counter machine, exciter and booster in connection with such a system.

Having thus described my invention what I claim as new and desire to secure by Letters Patent is:

1. The combination with a main generator, a regulating battery and a booster in the battery circuit of an exciter dynamo for the booster, and a counter electro-motive force machine controlling the current in the field of the exciter and having a field coil responsive to variations of electrical condition of the system.

2. The combination with a main generator, a branch circuit thereto, a regulating battery and a booster in the battery circuit of an exciter dynamo for the booster, and a counter electro-motive force machine controlling the current in the field of the exciter and having a field coil in the branch circuit of the main generator.

3. The combination of a main generator, a battery, a booster in the battery branch, a motor mechanically connected to the booster, an exciter for said booster field, a dynamo for regulating said exciter, and a motor mechanically connected to the exciter and its regulating dynamo.

4. The combination of a main generator, a battery, a booster in the battery branch, a motor mechanically connected to the booster, an exciter for said booster field, a dynamo for regulating said exciter having its field coil in the generator branch, and a motor mechanically connected to the exciter and its regulating dynamo.

5. The combination of a main generator, a battery, a booster, a field winding for the booster specially wound for low maximum current density, a regulating dynamo connected to said field winding to control the current therein, a field winding for said regulating dynamo also specially wound for low maximum current density, and means for applying to the latter field winding the resultant of opposing potential differences and varying said resultant responsively to changes of electrical condition of the system.

6. The combination of a main generator, a battery, a booster, a field winding for the booster specially wound for low maximum current density, a regulating dynamo connected to said field winding to control the current therein, a field winding for said regulating dynamo also specially wound for low maximum current density, and means for applying to the latter field winding the resultant of opposing potential differences and varying said resultant responsively to changes of current strength of the main generator.

7. The combination of a main generator, a battery, a booster, an exciter for the booster field having its field winding specially wound for low maximum current density and means for applying to the exciter field winding the resultant of opposing potential differences, and varying said resultant responsively to changes of electrical condition of the system.

8. The combination of a main generator, a battery, a booster, an exciter for the booster field having its field winding specially wound for low maximum current density, means for applying to the exciter field winding the resultant of opposing potential differences, and a regulating apparatus controlled by changes of electrical condition of the system to vary one of said potential differences.

9. The combination of a booster having a field winding specially wound for low maximum current density, an exciter therefor having a field winding also specially wound for low maximum current density, a circuit carrying a varying current, and regulating apparatus controlling the current in the exciter field and responsive to variations of current in said circuit.

10. The combination of a booster having a field winding specially wound for low maximum current density, an exciter therefor, a circuit carrying a varying current, and regulating apparatus controlling the current in the exciter field and responsive to variations of current in said circuit.

11. The combination of a booster, an exciter therefor having a field winding specially wound for low maximum current density, a circuit carrying a varying current, and regulating apparatus controlling the current in the exciter field and responsive to variations of current in said circuit.

12. The combination of a main generator, a battery, a booster, an exciter for said booster, a regulating dynamo controlling the booster field current, opposing field windings for said regulating dynamo each specially wound to have an excess of magnetizing power, and means for controlling the current in one of the opposing windings responsively to changes of electrical condition of the system.

13. The combination of a main generator, a battery, a booster, an exciter for said booster, a regulating dynamo controlling the booster field current, opposing field windings for said regulating dynamo each specially bulky, and means for controlling the current in one of the opposing windings responsively to changes of electrical condition of the system.

14. The combination of a main generator, a battery, a regulating booster, an exciter for regulating the booster, and a counter electromotive force machine, for regulating the exciter, the exciter and booster having field windings specially wound for low maximum current density.

15. A booster set comprising a booster having field windings specially wound for low maximum current density, an exciter therefor having similar specially wound field windings, and an automatically regulated apparatus for applying to said exciter field, a varying resultant of opposing potential differences.

16. The combination of a main generator, a battery, a booster, regulating apparatus for the booster, a regulating coil for said apparatus, means for opposing the action of said coil upon said apparatus, and adjusting mechanisms connected together to simultaneously adjust the power of said regulating coil and of the said opposing means.

17. The combination of a main generator, a battery, a booster, regulating apparatus for the booster, a regulating coil for said apparatus, means for opposing the action of said coil upon said apparatus, and adjusting mechanisms connected together to simultaneously adjust the power of said regulating coil, the power of the said opposing means and the action of the regulating apparatus upon said booster.

18. The combination of a main generator, a battery, a booster, an exciter for said booster, regulating apparatus for said exciter, a regulating coil for said apparatus, means for opposing the action of said coil upon said apparatus, and three adjusting mechanisms connected together to simultaneously adjust the power of the regulating coil, the power of the opposing means and the action of the regulating apparatus upon said exciter.

19. The combination of a main generator, a battery, a booster, regulating apparatus for the booster, a regulating coil for said apparatus responsive to current changes of the main generator, means for opposing the action of said coil upon said apparatus, and adjusting mechanisms connected together to simultaneously adjust the power of said regulating coil and of the said opposing means.

20. The combination of a main generator, a battery, a booster, regulating apparatus for the booster, a regulating coil for said apparatus responsive to current changes of the main generator, means for opposing the action of said coil upon said apparatus, and adjusting mechanisms connected together to simultaneously adjust the power of said regulating coil, the power of the said opposing means and the action of the regulating apparatus upon said booster.

21. The combination of a main generator, a battery, a booster, an exciter for said booster, regulating apparatus for said exciter, a regulating coil for said apparatus responsive to current changes of the main generator, means for opposing the action of said coil upon said apparatus, and three adjusting mechanisms connected together to simultaneously adjust the power of the regulating coil, the power of the opposing means and the action of the regulating apparatus upon said exciter.

22. The combination of a main generator, a battery, a booster, an exciter for the booster, apparatus for applying the resultant of opposing potential differences to the exciter field winding, a regulating coil acting upon said apparatus to vary said resultant, means for opposing the action of said coil upon the apparatus, and three adjusting mechanisms connected together to simultaneously adjust the power of said coil upon said apparatus, the power of said opposing means and the effect of any given resultant of potential differences upon the exciter field.

23. The combination of a main generator, a battery, a booster, an exciter for the booster, apparatus for applying the resultant of opposing potential differences to the exciter field winding, a regulating coil responsive to current changes of the main generator acting upon said apparatus to vary said resultant means for opposing the action of said coil upon the apparatus, and three adjusting mechanisms connected together to simultaneously adjust the power of said coil upon said apparatus, the power of said opposing means and the effect of any given resultant of potential differences upon the exciter field.

24. The combination of a main generator, a battery, a booster, a coil controlling the booster field strength, a counter machine connected in a branch in series with said coil, a regulating field winding for the counter machine, an opposing field coil on the counter machine, resistances in series with each of said field coils, and mechanism for simultaneously increasing or decreasing the value of said resistances.

25. The combination of a main generator, a battery, a booster, an exciter therefor, a counter machine connected in a branch in series with the exciter field winding, a regulating field winding and an opposing field winding for the counter machine, resistances in series with the regulating winding, the opposing winding and the exciter winding, and mechanism for simultaneously adjusting said resistances.

26. A booster set comprising a booster having field windings specially wound for low maximum current density, an exciter therefor having similar specially wound field windings, and an automatically regulated apparatus for applying to said exciter field, a varying resultant of opposing potential differences which are independently generated.

In testimony whereof, I have signed my name to this specification, in the presence of two subscribing witnesses.

ALBERT S. HUBBARD.

Witnesses:
 EDWIN SEGER,
 ANNA DALY.